W. VAN ANDEN.
Making Railroad Chairs.
No. 386.
Reissued Aug. 12, 1856.
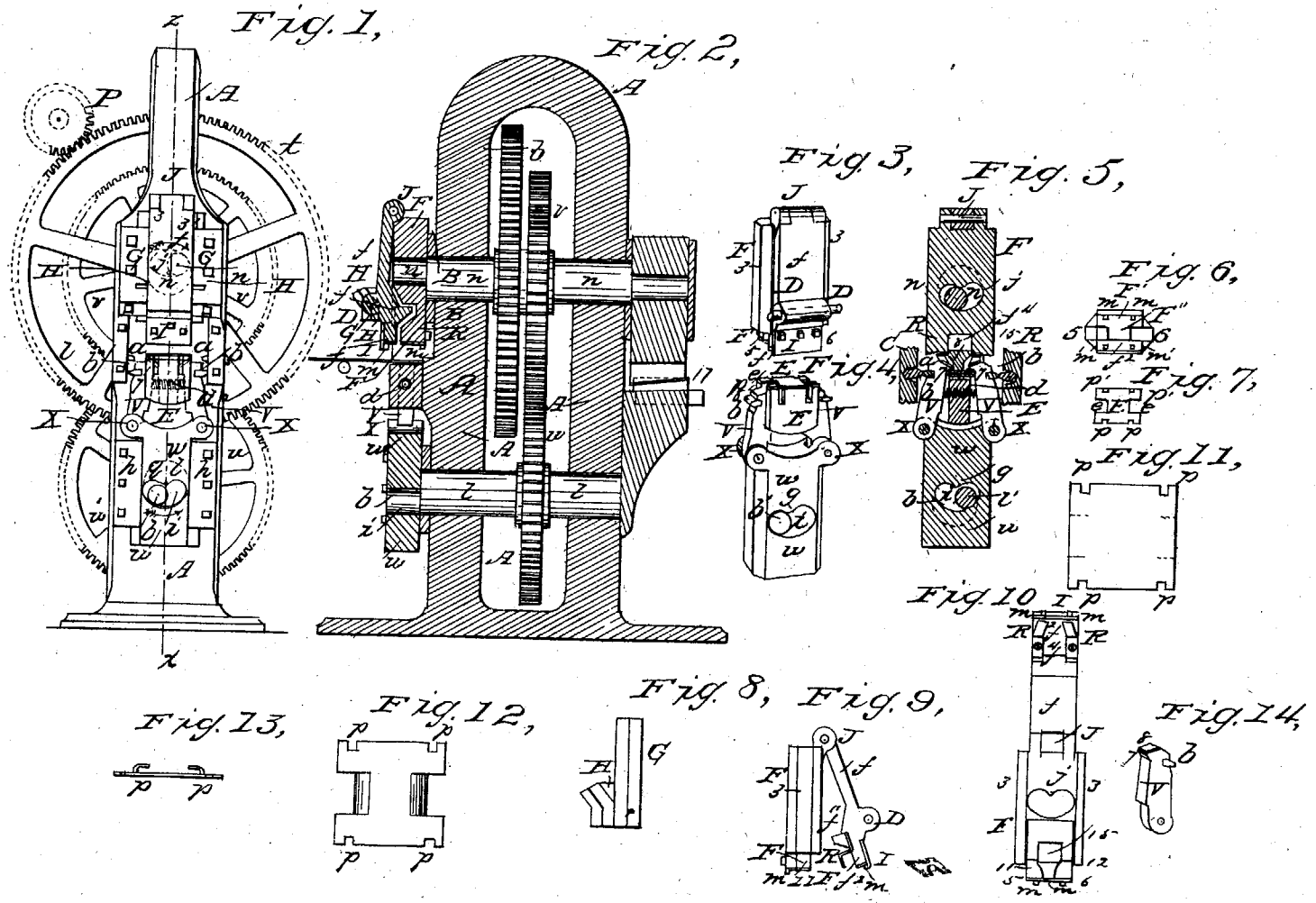
N. PETERS, Photo-Lithographer, Washington, D. C.

UNITED STATES PATENT OFFICE.

WILLIAM VAN ANDEN, OF POUGHKEEPSIE, ASSIGNOR, BY MESNE ASSIGNMENTS, TO HIMSELF, AND A. FREAR AND J. ROWE, OF NEW YORK, N. Y.

MACHINE FOR MAKING WROUGHT-IRON RAILROAD-CHAIRS.

Specification forming part of Letters Patent No. 7,330, dated April 30, 1850; Reissue No. 386, dated August 12, 1856.

*To all whom it may concern:*

Be it known that I, WILLIAM VAN ANDEN, of Poughkeepsie, Dutchess county, New York, have invented certain new and Improved Machinery for Making Railroad-Chairs of Wrought-Iron; and I do hereby declare that the following specification, taken in connection with the drawings, is a full, clear, and exact description thereof.

Figure 1 is a front elevation of the machine, with the upper die in the act of descending to clamp the blank fast after cutting it off the bar and punching the recesses therein. Fig. 2 is a section on the line *x x* of Fig. 1, with the exception of the cogs and shafting, which are shown in elevation. Fig. 3 is a perspective view of the upper clamp and die with its parts closed together. Fig. 4 is a perspective view of the lower jaw or clamp, and also of the shears and benders. Fig. 5 is a vertical section through both clamps and the shears and their accessories. Fig. 6 is a view of the acting surface of the upper die when its parts are closed together. Fig. 7 is a view of the acting surface of the lower jaw or clamp. Fig. 8 is an elevation of a grooved track which governs the opening and closing of the parts of the upper die. Fig. 9 is a side elevation of the upper die and some of its accessories, with a finished chair in the act of being discharged therefrom. Fig. 10 is an elevation of the interior surfaces of the parts of the upper jaws. Fig. 11 is a view of a chair-blank cut and punched prior to the severing and forming of its lips. Fig. 12 is a bird's-eye view of a completed chair. Fig. 13 is a side elevation of the same. Fig. 14 is a perspective view of one of the cutting and bending shears.

Prior to the date of my invention wrought-iron railroad-chairs were of two classes—first, those partially rolled into shape in a rolling-mill in long bars and then sawed into proper lengths, and, second, those formed usually by hand or hand-tools out of blanks of plate-iron of nearly a uniform thickness.

My invention relates to the latter class of chairs, and by means of the machine devised by me they may be formed by machinery without any aid from an operator further than is necessary to feed the machine. In forming such chairs there are a series of operations necessary to be performed, which may be enumerated as follows: first, the severing of a blank of proper size from a bar of wrought-iron; second, the clamping of the same firmly between dies or clamps, so that its plane surface may be preserved at all parts except the lips; third, the severing of the lips; fourth, the bending of such lips into proper shape to embrace a rail, and, lastly, the discharging of the chair from the machine. To these may be added the punching of proper holes for the reception of spikes, when such are needed.

With these series in view the nature of the first part of my invention consists in clamping a chair-blank firmly between two surfaces, so that it may be submitted to the action of proper shears or their equivalents, substantially in the manner hereinafter set forth.

The nature of the second part of my invention consists in severing the lips of a chair-blank thus clamped by proper shears or their equivalents, acting substantially as herein described.

The nature of the third part of my invention consists in giving to such shears a motion in two directions, so that they may first sever the lips and bend them at right angles to the rest of the blank, and afterward approach each other and close the lips together, so that they may conform to the shape of the base of a rail, substantially as hereinafter specified.

The nature of the fourth part of my invention consists in constructing a die, part of which acts as a clamp and part as a former, in two pieces capable of approaching to and receding from each other, substantially in the manner and for the purposes hereinafter set forth.

The nature of the fifth part of my invention consists in discharging a chair from a parting-die by a hook or bar, or its equivalent, having a positive motion, and acting substantially as described.

The nature of the sixth part of my invention consists in combining in a single machine clamps one of which acts as a former and shears and benders, and a discharger, substantially in the manner herein specified.

In the drawings the same letters refer to the same parts in all the figures, and by their aid I will proceed to describe a machine constructed according to the principles of my invention. A strong frame, which serves to assemble all parts of the machine, is shown at A A, and in it are mounted two shafts, *b b n n*. The latter of these carries two cog-wheels, one of which, *t*, is a driver actuated by a pinion, P, receiving motion from any proper prime mover, and the other, *v*, engages with a wheel of the same size, *w*, mounted on the shaft *l*. These two shafts, therefore, rotate in opposite directions with the same speed. On the ends of each of these shafts are formed pins, eccentric to the shaft, and acting, in fact, as crank-pins *n'* and *b'*. Upon the front of the frame are secured cheeks G G *h h*, which, in connection with the frame, form guides, in the former of which slides a compound clamp and former or die, F *f*, and in the latter moves a shear-stock, *w w*. Between these cheeks a stationary clamp, E, is firmly secured to the frame. The compound die and the shear-stock rise, fall, and pause at proper intervals in consequence of the crank-pins moving in heart-shaped cam-boxes *i* and *j*. To the shear-stock are secured, by hinges X X, two shears, V V, which may be faced with steel on their cutting-surfaces, as at 8 8, and are hooked over, as at 7 7, so that they may bend or form the lips after they are severed. These shears being hinged, may approach or recede from each other, and are kept apart by a spring, *d*, located in a recess in the stationary clamp; but as it is necessary that they should be caused to approach forcibly in order to bend the lips over the former they are provided with small studs or ears *b b*, which at times strike against vibrating chocks *a a*, located in recesses in certain cheeks, *c c*, bolted onto the front of the frame. The ends of these chocks rest always against the shears or their ears, and form with the latter a sort of toggle-press. The upper surface of the lower and stationary clamp, E, may be faced with steel, and conforms with the shape of the bed-piece or bottom side of a finished chair, (see Fig. 7,) and may have formed in it sockets *p' p'*, for the reception of punches *m m m' m'*, secured in the compound clamp and die. The shears rise through the recesses *e e*, which are of the size of a chair-lip. The upper or compound clamp and die has a double stock, F *f*, whose parts are hinged to each other at J. The latter has projecting from it tongues 3 3, which slide in the guide formed by cheeks G and the frame at B, and the former is fitted with a pin, D, whose ends enter bent grooves H H, formed in projections from the cheeks G. As this compound die rises and the pin enters that part of the grooves H which is not vertical, the part *f* is by its own ascent and through the intervention of the pin and grooves thrown outward from the part F, so that the faces F' F'' (see Figs. 6 and 9) are separated from the face $f^2$. The lower part or acting surface of the compound die is shaped like the upper surface of the stationary clamp, being cut away at 5 6 to permit the lips of a chair to rise as they are bent, (see Fig. 6,) and above its face are two recesses, 11 and 12, with a bar or cross-piece, *y*, separating them. (See Figs. 5 and 10.) These recesses permit the shears and benders to rise, and in them the lips are bent. $f^2$ is that part of the acting face which at times swings outward and separates from the other part of the face F' F''. From the inner face of *f* projects a lug, $f^4$, which when the two halves of the clamp and die are closed enters a recess, 15, in the corresponding face of F, and the two serve to prevent one half of the die from sliding on the other, and relieve the hinge at J. From the inner face of the inner die also project two hooks, R R, which when the halves are in contact lie in the rear part of the recess 11 12, and when one half the clamp and die separate from the other wipe along the sides of the bar *y*. A shear-blade, I, may be attached to the swinging half of the upper die, so that it will sever off a length of proper size from a bar of iron, which should be entered into the machine until it strikes the stop 4.

In Fig. 11 is shown on a larger scale a chair-blank cut and punched at *p p*, with dotted lines indicating the line of severance of the lips; and in the use of my apparatus I generally intend thus to prepare the blank in a separate machine before clamping, cutting, and bending it, as chairs differing to some extent in size may be made in the same machine, and the holes may be punched according to the directions of those who use the chairs.

In Figs. 12 and 13 are represented an elevation and plan of finished chair, showing clearly how the lips are cut and bent so as to embrace the lower flange of a rail.

For the sake of convenience I have attached to the rear of the machine a shears, as at 17, where the blanks may be cut before they are entered between the clamps.

In the action of the machine, supposing it to be supplied with a heated blank of proper size laid upon the lower or stationary clamp, the compound clamp and die commences to descend, and as it descends the pin D enters the vertical part of its containing groove, whereby the two halves of the die are closed together. As the die descends it rests upon the blank, and then clamps it firmly down upon the stationary clamp or jaw, holding it there, as in a vice, while the pin *n'* travels over that part of the heart-shaped slot which is concentric in its curve with the upper shaft. While the blank is thus held the shear-stock, with its shears and benders, ascends and severs the lips against the edges of the face of the upper die, which then act as stationary jaws, and as the shears ascend they bend the lips upward until the ears *b* commence to press against the vibrating chocks *a a*. Then the shears commence, by the toggle action of the ears and chocks, to approach each other, and finally bend the lips over that part of the die shown at F″, and if long enough against the bar or cross-piece *y*. The chair is now completed, and the shears commence to descend, being thrown apart in their descent by the coiled spring *d* as fast as the toggles will permit such action. When the shear faces are fairly clear of the chair in their descent, the upper compound die commences to ascend, the pin D enters the inclined part of its slot, the forward part of the compound die swings outward, and the hooks R scrape along the sides of the cross-piece, draw the chair-lips along it till they are freed, and then the finished chair falls out of the machine. (See Fig. 9.) When such a shears as shown at I is used, and such punches as *m m′*, the first action of the machine upon a bar of iron is to cut it to length and punch it; but the clamping of the blank then takes place, and all the other operations of the machine follow one another as above described.

The clamping of the blank prior to the severing of the lips is one of the most important features in a machine for making railroad-chairs. If it were attempted to cut the lips of a chair with the blank merely resting against a die, and not clamped firmly between two dies, the shears as they cut would bend the center of the chair downward, so that the finished chair would be convex on its lower face. A chair thus convex (and hand-made chairs are usually so) never lies firm on a string-piece or sleeper, and cannot be made to take a firm bed even by dubbing away the wood. It is, therefore, wanting in one great requisite of a chair, whereas chairs made in my machine have flat bases, and are so irrespective of the originally-warped surface of the blank, as all twists and winds are taken out by the clamping, as described.

My machine may be modified in various ways without departing from the principles of my invention, as the acting surfaces may receive their motion from any other mechanical devices, so long as such motion takes place at the proper time and continues through a suitable distance. Even the acting surfaces may have their motion with respect to the frame changed, as the stationary parts may be moved and the movable parts may be fixed. The shears may be moved in and out by proper cams or their equivalents. The discharging-hooks may be actuated in many different ways, and the upper die may open in divers manners to discharge a chair, and be forced to open by any proper mechanism. Other sorts of springs or a positive motion might be substituted for the coiled spring which holds the shears apart; but all such changes would not effect the action of the various acting surfaces upon a blank so as to form it into a chair, and it is in the substantial identity and combined action of these surfaces that my invention is to be found, and not in the trains of mechanism which give them motion.

Having thus described a machine constructed according to the principle of my invention, I claim therein as new and of my own invention—

1. The combination of two or more properly-shaped dies, between which a chair-blank is clamped prior to the cutting of that portion of it which constitutes the lips thereof, substantially in the manner and for the purposes herein described.

2. Automatic shears, in combination with properly-shaped dies for clamping a chair-blank and cutting the lips thereof, substantially as herein set forth.

3. Such shears when they also act as benders to complete the formation of a chair-lip by reason of their having a motion in two directions, substantially in the manner herein specified.

4. A double or parting clamp and die, substantially such as is herein described, so that a chair may be removed from the die upon which it is formed, as herein set forth.

5. Discharging a chair from a double or parting die or its equivalent by hooks or their equivalents acting to shove the chair off of a die, substantially in the manner herein described.

6. In combination, two clamping-dies, one of which acts as a former and divides at proper intervals, shears which also act as benders or their equivalents, and a discharging apparatus, acting in respect to each other substantially in the manner and for the purposes herein set forth.

In testimony whereof I have hereunto subscribed my name, in the city of New York, on this 14th day of June, A. D. 1856.

WM. VAN ANDEN.

Witnesses:
P. GRIFFIN,
DAVID MYERS.